(12) United States Patent
Inaba

(10) Patent No.: US 8,974,760 B2
(45) Date of Patent: Mar. 10, 2015

(54) HYDROGEN CHLORIDE GAS EJECTING NOZZLE, REACTION APPARATUS FOR PRODUCING TRICHLOROSILANE AND METHOD FOR PRODUCING TRICHLOROSILANE

(71) Applicant: Mitsubishi Materials Corporation, Tokyo (JP)

(72) Inventor: Chikara Inaba, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/916,078

(22) Filed: Jun. 12, 2013

(65) Prior Publication Data

US 2013/0272946 A1    Oct. 17, 2013

Related U.S. Application Data

(62) Division of application No. 12/289,210, filed on Oct. 22, 2008, now Pat. No. 8,486,339.

(30) Foreign Application Priority Data

Oct. 25, 2007  (JP) ................ 2007-277788
Jul. 30, 2008   (JP) ................ 2008-197072

(51) Int. Cl.
*C01B 33/107* (2006.01)
*B01J 8/18* (2006.01)
(Continued)

(52) U.S. Cl.
CPC .......... *B01J 8/1872* (2013.01); *B01J 4/002* (2013.01); *B01J 8/1818* (2013.01); *B01J 8/1827* (2013.01);
(Continued)

(58) Field of Classification Search
USPC .......... 423/342, 347, 348, 349, 350
See application file for complete search history.

(56) References Cited

U.S. PATENT DOCUMENTS 2,841,476 A    7/1958   Dalton
3,040,439 A    6/1962   Frost
(Continued)

FOREIGN PATENT DOCUMENTS

BE    1016050       2/2006
DE    102006014457  10/2007
(Continued)

OTHER PUBLICATIONS

European Search Report dated Feb. 24, 2009, issued on the corresponding European patent application No. 08167142.2 and English translation thereof.
(Continued)

*Primary Examiner* — Kaj K Olsen
*Assistant Examiner* — James Fiorito
(74) *Attorney, Agent, or Firm* — Locke Lord LLP

(57) ABSTRACT

There is provided a hydrogen chrolide gas ejecting nozzle 1 used in a reaction apparatus for producing trichlorosilane in which metal silicon powder is reacted with hydrogen chloride gas to generate trichlorosilane. The member is provided with a shaft portion extending in the longitudinal direction and a head portion that is provided on an end of the shaft portion and extends in a direction intersecting the longitudinal direction of the shaft portion. A supply hole extending in the longitudinal direction is formed in the shaft portion, a plurality of ejection holes are formed in the head portion, and each of the ejection holes is communicatively connected to the supply hole and opened on the outer surface of the head portion toward a direction intersecting the direction to which the supply hole extends.

13 Claims, 7 Drawing Sheets

(51) Int. Cl.
*B01J 4/00* (2006.01)
*B01J 8/44* (2006.01)
*B01J 19/26* (2006.01)
*C01B 33/03* (2006.01)

(52) U.S. Cl.
CPC .. *B01J 8/44* (2013.01); *B01J 19/26* (2013.01); *C01B 33/10763* (2013.01); *C01B 33/10742* (2013.01); *B01J 2219/0036* (2013.01)
USPC ............ 423/342; 423/348; 423/349; 423/350

(56) References Cited

U.S. PATENT DOCUMENTS

| | | | | |
|---|---|---|---|---|
| 3,215,522 A | * | 11/1965 | Kuhlmann | .................. 75/10.58 |
| 5,014,632 A | | 5/1991 | Isaksson | |
| 5,382,412 A | * | 1/1995 | Kim et al. | .................... 422/142 |
| 5,794,857 A | | 8/1998 | Chen et al. | |
| 2006/0219735 A1 | | 10/2006 | Faye et al. | |

FOREIGN PATENT DOCUMENTS

| | | |
|---|---|---|
| EP | 1223145 | 7/2002 |
| JP | 02-145413 A | 6/1990 |
| JP | 05-256413 A | 10/1993 |
| JP | 09-299784 A | 11/1997 |
| JP | 10-002676 A | 1/1998 |
| JP | 2002-220219 | 8/2002 |
| KR | 10-2005-0002234 | 1/2005 |
| RU | 2060836 C1 | 5/1996 |
| WO | WO-2004/041424 | 5/2004 |
| WO | WO-2007/086612 | 8/2007 |
| WO | WO 2007/145474 * 12/2007 | .............. C30B 29/06 |

OTHER PUBLICATIONS

Big Encyclopedic Dictionary "Polytecnic", under the editorship of A.U. Ichlinskiy, Moscow, scientific publishing house "Big Russian Encyclopedia" 2000, p. 82, col. 1, lines 26-29.
Office Action dated Apr. 17, 2012, issued for the Russian Patent Application No. 2008142152 and English translation thereof.
English Abstract for JP 05-256413. (Oct. 1993).
English Abstract and Machine Translation for JP 09-299784. (Nov. 1997).
English Abstract and Machine Translation for JP 10-002676. (Jan. 1998).
Office Action mailed Apr. 27, 2011, issued for U.S. Appl. No. 12/289,210.
Office Action mailed Oct. 17, 2011, issued for U.S. Appl. No. 12/289,210.
Office Action mailed Jun. 14, 2012, issued for U.S. Appl. No. 12/289,210.
Office Action mailed Dec. 7, 2012, issued for U.S. Appl. No. 12/289,210.

\* cited by examiner

HYDROGEN CHLORIDE GAS EJECTING NOZZLE, REACTION APPARATUS FOR PRODUCING TRICHLOROSILANE AND METHOD FOR PRODUCING TRICHLOROSILANE

CROSS-REFERENCE TO RELATED APPLICATIONS

This application is a divisional application of U.S. application Ser. No. 12/289,210, filed Oct. 22, 2008 which claims the right of priority under 35 U.S.C. §119 based on Japanese Patent Application Nos. 2007-277788 and 2008-197072 filed Oct. 25, 2007 and Jul. 30, 2008, respectively.

BACKGROUND OF THE INVENTION

1. Field of the Invention

The present invention relates to a hydrogen chrolide gas ejecting nozzle used in a reaction apparatus for producing trichlorosilane when trichlorosilane is generated by reaction of metal silicon powder with hydrogen chloride gas, thereby ejecting the hydrogen chloride gas into the metal silicon powder supplied inside an apparatus main body, a reaction apparatus for producing trichlorosilane equipped with the hydrogen chrolide gas ejecting nozzle, and a method for producing trichlorosilane by using the hydrogen chrolide gas ejecting nozzle.

2. Description of Related Art

Trichlorosilane ($SiHCl_3$) used as a material for producing extremely high purity silicon having a purity greater than 99.999999999% is produced by reacting metal silicon powder (Si) of about 98% in purity with hydrogen chloride gas (HCl).

As a reaction apparatus for producing trichlorosilane in which metal silicon powder is reacted with hydrogen chloride gas to generate trichlorosilane as described above, there has been proposed, for example, an apparatus disclosed in Japanese Unexamined Patent Application, First Publication No. 2002-220219, which is provided with an apparatus main body at which metal silicon powder is supplied and gas introduction device for introducing hydrogen chloride gas into the apparatus main body from the bottom portion of the apparatus main body. In this case, the gas introduction device is provided with hydrogen chrolide gas ejecting nozzles having an ejection hole for ejecting hydrogen chloride gas into metal silicon powder.

Metal silicon powder, the grain size of which is relatively small, that is, 1000 μm or smaller, is supplied into an apparatus main body, and hydrogen chloride gas is ejected at a high speed through a hydrogen chrolide gas ejecting nozzle from the bottom portion of the apparatus main body, by which metal silicon powder is fluidized. Thereby, the metal silicon powder is sufficiently contacted with the hydrogen chloride gas to carry out a reaction, thereby obtaining trichlorosilane.

Incidentally, conventional hydrogen chrolide gas ejecting nozzles are fixed to a bottom portion of an apparatus main body so that the ejection holes thereof open upward. In this case, since metal silicon powder is small in grain size, as described previously, the powder may enter into ejection holes to result in clogging. Therefore, it is necessary to exchange or clean the hydrogen chrolide gas ejecting nozzle. However, since the hydrogen chrolide gas ejecting nozzle is fixed to the bottom portion of the apparatus main body, the hydrogen chrolide gas ejecting nozzle cannot be easily removed.

SUMMARY OF THE INVENTION

The present invention has been made in view of the above situation, an object of which is to provide a hydrogen chrolide gas ejecting nozzle capable of suppressing the clogging resulting from metal silicon powder and also improving the production efficiency of trichlorosilane by widely dispersing hydrogen chloride gas, a reaction apparatus for producing trichlorosilane equipped with the hydrogen chrolide gas ejecting nozzle and a method for producing trichlorosilane by using the hydrogen chrolide gas ejecting nozzle.

The hydrogen chrolide gas ejecting nozzle of the present invention is a hydrogen chrolide gas ejecting nozzle used in a reaction apparatus for producing trichlorosilane in which metal silicon powder is reacted with hydrogen chloride gas to generate trichlorosilane and provided with a shaft portion extending in a longitudinal direction and a head portion extending in a direction intersecting the longitudinal direction of the shaft portion. A supply hole extending in the longitudinal direction is disposed at the shaft portion. A plurality of ejection holes are formed at the head portion. Each of the ejection holes is communicatively connected to the supply hole and opened on the outer surface of the head portion by extending in a direction intersecting the direction to which the supply hole extends.

The hydrogen chrolide gas ejecting nozzle of the present invention is provided with a shaft portion extending in a longitudinal direction and a head portion extending in a direction intersecting the longitudinal direction of the shaft portion. A supply hole disposed at the shaft portion extends in the longitudinal direction of the shaft portion, and ejection holes extending in a direction intersecting the supply hole are disposed at the head portion. Therefore, where the hydrogen chrolide gas ejecting nozzle is attached to the above described reaction apparatus for producing trichlorosilane, metal silicon powder is less likely to enter into the ejection holes, thus making it possible to prevent the ejection holes from being clogged.

Further, a plurality of ejection holes are formed, thereby hydrogen chloride gas can be ejected in a plurality of directions, and hydrogen chloride gas can be widely dispersed into metal silicon powder to accelerate the reaction.

It is preferable that the hydrogen chrolide gas ejecting nozzle of the present invention is provided at the shaft portion with a thread portion.

The hydrogen chrolide gas ejecting nozzle of the present invention is attached removably to the gas introduction devices of the above described reaction apparatus for producing trichlorosilane. Therefore, it can be easily exchanged when deteriorated after prolonged use. Further, if an ejection hole should be clogged, the member can be taken out for cleaning and therefore quite easy in maintenance. Still further, the hydrogen chrolide gas ejecting nozzle is easily attached or detached by screwing. For this reason, the member can be further improved in maintenance. It is preferable that the head portion of the hydrogen chrolide gas ejecting nozzle be formed in such a shape as to engage with industrial tools, for example, a wrench.

It is also preferable that the hydrogen chrolide gas ejecting nozzle of the present invention be formed in such a manner that a plurality of the ejection holes extend radially from the supply hole.

In the hydrogen chrolide gas ejecting nozzle of the present invention, hydrogen chloride gas supplied through the supply hole is ejected radially from a plurality of ejection holes, thus making it possible to more widely disperse the hydrogen chloride gas into metal silicon powder.

The reaction apparatus for producing trichlorosilane of the present invention is a reaction apparatus for producing trichlorosilane in which metal silicon powder is reacted with hydrogen chloride gas to generate trichlorosilane, and provided with an apparatus main body to which the metal silicon powder is supplied and gas introduction means for introducing the hydrogen chloride gas into the apparatus main body from the bottom portion of the apparatus main body. In the gas introduction devices, the hydrogen chrolide gas ejecting nozzle is attached removably through the bottom plate portion of the apparatus main body and the head portion is arranged on the bottom plate portion.

According to the reaction apparatus for producing trichlorosilane of the present invention, the hydrogen chrolide gas ejecting nozzle is prevented from being clogged, thereby securing a stable operation. Further, the hydrogen chloride gas is widely dispersed into the metal silicon powder, thus making it possible to improve greatly the production efficiency of trichlorosilane.

The method for producing trichlorosilane of the present invention is a method for producing trichlorosilane in which metal silicon powder is reacted with hydrogen chloride gas to generate trichlorosilane. More particularly, the hydrogen chrolide gas ejecting nozzle is attached to the bottom plate portion of the apparatus main body to which the silicon powder is supplied, the head portion is arranged on the upper surface of the bottom plate portion, and hydrogen chloride gas is ejected from the ejection holes of the hydrogen chrolide gas ejecting nozzle, while the metal silicon powder is supplied to a lower part of the apparatus main body.

The present invention makes possible the prevention of clogging resulting from metal silicon powder. The present invention also makes possible improvement in the production efficiency of trichlorosilane by widely dispersing hydrogen chloride gas.

DESCRIPTION OF THE PREFERRED EMBODIMENTS

Hereinafter, an explanation will be made for embodiments of the present invention by referring to the attached drawings.

Figure 1:
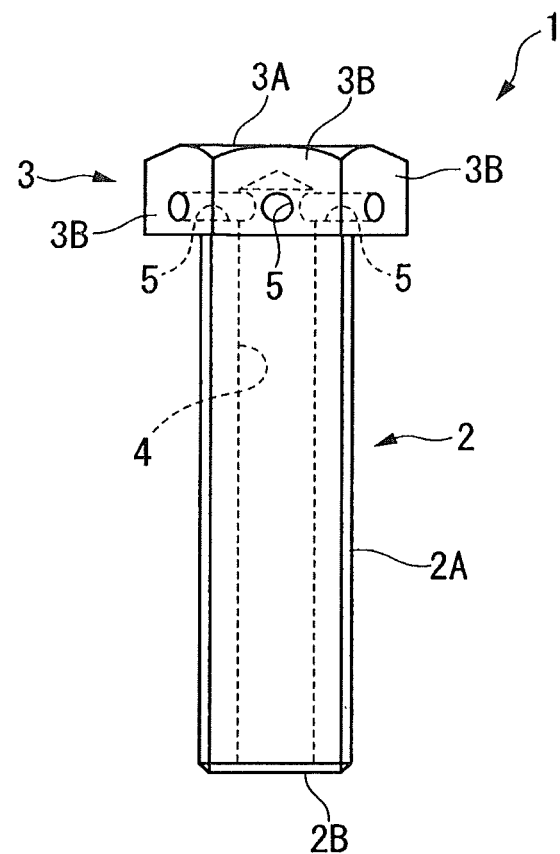
FIG. 1 is a side elevational view showing a hydrogen chrolide gas ejecting nozzle, which is an embodiment of the present invention.
Figure 2:
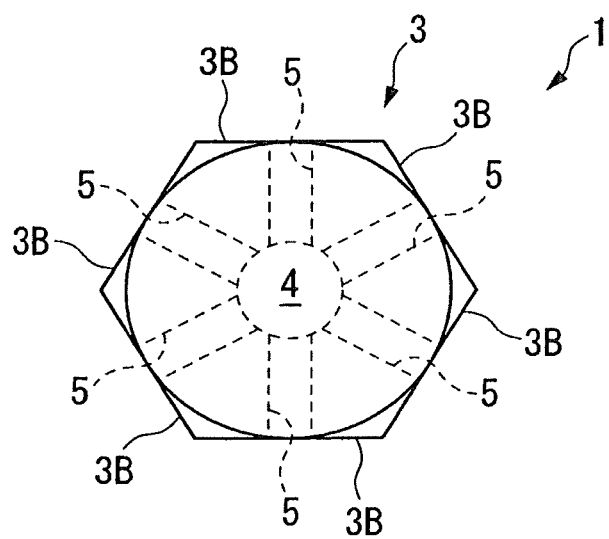
FIG. 2 is a top view of the hydrogen chrolide gas ejecting nozzle given in FIG. 1.

As shown in FIG. 1 and FIG. 2, the hydrogen chrolide gas ejecting nozzle 1 of the present embodiment is provided with a shaft portion 2 formed approximately in a cylindrical shape and a head portion 3 extending in a direction intersecting the longitudinal direction of the shaft portion 2 (the vertical direction in FIG. 1) at the upper end of the shaft portion 2.

In the present embodiment, the head portion 3 extends in a direction orthogonal to the longitudinal direction of the shaft portion 2, and has a regular hexagonal shape when viewed from the top, as shown in FIG. 2. In addition, an upper surface 3A of the head portion 3 is a plain surface orthogonal to the longitudinal direction of the shaft portion 2, and a side surface 3B of the head portion 3 is positioned orthogonal to the upper surface 3A. Thereby, the head portion 3 is formed approximately in a regular hexagonal column shape.

Further, a male thread 2A is formed on the outer circumferential surface of the shaft portion 2. Therefore, the hydrogen chrolide gas ejecting nozzle 1 is formed in the same shape as a hexagon head bolt and the head portion 3 is able to engage with industrial tools such as a wrench.

The shaft portion 2 is provided with a supply hole 4 which is opened on the lower end surface 2B thereof and extending along the longitudinal direction of the shaft portion 2. In addition, the supply hole 4 is not opened on the upper surface 3A of the head portion 3 but formed as a blind hole.

Then, the head portion 3 is provided with a plurality of ejection holes 5 communicatively connected to the supply hole 4 and extending in a direction intersecting a direction at which the supply hole 4 extends. In the present embodiment, as shown in FIG. 1 and FIG. 2, six ejection holes 5 are formed so as to be respectively orthogonal to the direction at which the supply hole 4 extends. These six ejection holes 5 are, as shown in FIG. 2, formed so as to extend radially from the supply hole 4 located at the center of the head portion 3 and respectively opened on the side surfaces of the head portion 3 formed in a regular hexagonal column shape. In other words, an opening portion of the ejection hole 5 faces in a direction orthogonal to the longitudinal direction of the shaft portion 2.

Next, an explanation will be made for a reaction apparatus for producing trichlorosilane 10 in which the hydrogen chrolide gas ejecting nozzle 1 of the present embodiment is used.

Figure 3:
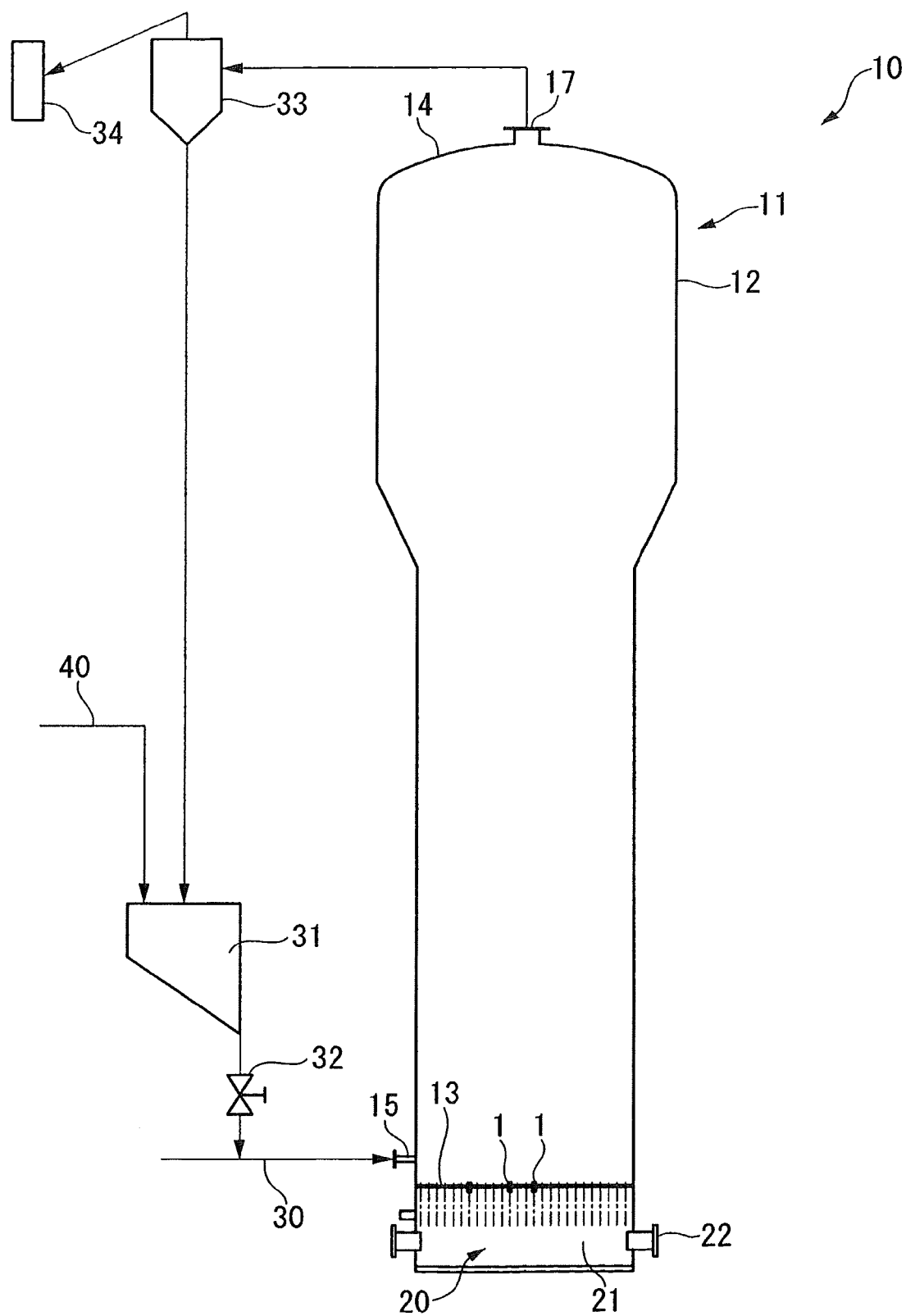
FIG. 3 is a cross-sectional view showing a reaction apparatus for producing trichlorosilane using the hydrogen chrolide gas ejecting nozzle given in FIG. 1.
Figure 4:
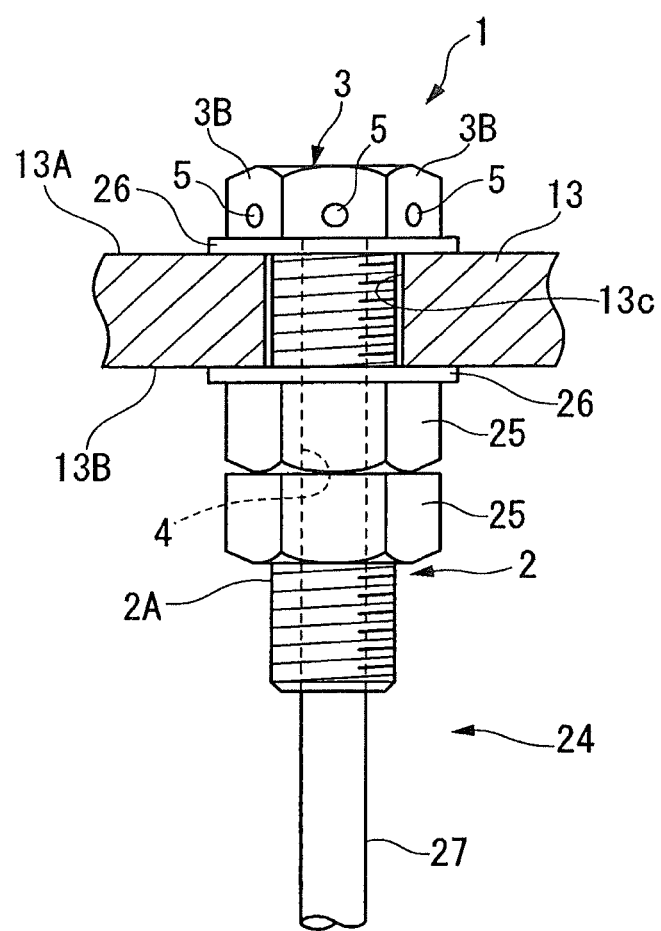
FIG. 4 is a front view showing a state in which the hydrogen chrolide gas ejecting nozzle given in FIG. 1 is attached to gas introduction means.

As shown in FIG. 3, the reaction apparatus for producing trichlorosilane 10 has an apparatus main body comprising a body portion 12 having an approximately cylindrical shape and a bottom plate portion 13 and a ceiling 14 respectively sealing the lower and top ends of the body portion 12. In this case, as shown in FIG. 3 and FIG. 4, an upper surface 13A and a lower surface 13B of the bottom plate portion 13 are arranged so as to be orthogonal to the axis line of the cylinder formed by the body portion 12.

A silicon powder supply port 15 for supplying metal silicon powder into the apparatus main body 11 is formed at a lower part of the body portion 12 of the apparatus main body 11. An introduction piping 30 for carrier gas is connected to the silicon powder supply port 15, metal silicon powder is supplied from a feed hopper 31 through a valve 32 to the introduction piping 30 for carrier gas and then supplied through the silicon powder supply port 15 into the apparatus main body 11. Further, a cyclone separator 33 to be described later is connected to the feed hopper 31, and a silicon powder supply system 40 for supplying the metal silicon powder from the outside is also connected to the feed hopper 31.

A gas removal port 17 is disposed at the center of the ceiling 14 of the apparatus main body 11 for removing trichlorosilane gas generated by reaction.

Gas introduction unit 20 is installed below the apparatus main body 11 for introducing hydrogen chloride gas into the apparatus main body 11.

The gas introduction unit 20 is provided with a gas chamber 21 for pooling hydrogen chloride gas and gas supply ports 22 for supplying the hydrogen chloride gas into the gas chamber 21. In this case, the gas chamber 21 is partitioned from the interior of the apparatus main body 11 by the bottom plate portion 13 of the apparatus main body 11.

Then, as shown in FIG. 4, the hydrogen chrolide gas ejecting nozzle 1 of the present embodiment is placed at the bottom plate portion 13 of the apparatus main body 11. More specifically, an attachment hole 13C is formed at the bottom plate portion 13 of the apparatus main body 11, and the shaft portion 2 of the hydrogen chrolide gas ejecting nozzle 1 is inserted into the attachment hole 13C. Then, the head portion 3 of the hydrogen chrolide gas ejecting nozzle 1 is placed on the upper surface 13A of the bottom plate portion 13. Two nuts 25 are screwed onto a male thread portion 2A formed at the shaft portion 2 from the side of the lower surface 13B of the bottom plate portion 13, and the bottom plate portion 13 is held between the nuts 25 and the head portion 3. In addition, a washer 26 is placed between the head portion 3 and the upper surface 13A of the bottom plate portion 13 and another washer 26 is placed between the nut 25 and the lower surface 13B of the bottom plate portion 13.

Thereby, the shaft portion 2 of the hydrogen chrolide gas ejecting nozzle 1 is inserted through the bottom plate portion 13 into the gas chamber 21 and attached removably to the bottom plate portion 13. Further, an equalizing pipe 27 is communicatively connected to the supply hole 4 of the shaft portion 2.

As described above, the hydrogen chrolide gas ejecting nozzle 1 of the present embodiment is fixed to the bottom plate portion 13 of the apparatus main body 11 and arranged so that the shaft portion 2 extends from the bottom plate portion 13 downwardly (along the axis line of a cylinder formed by the body portion 12 of the apparatus main body 11) and also the upper surface 3A of the head portion 3 is parallel with the lower surface 13B of the bottom plate portion 13 of the apparatus main body 11. Further, the supply hole 4 of the shaft portion 2 is arranged so that the lower end thereof is opened inside the gas chamber 21, while the ejection holes 5 of the head portion 3 are arranged so as to be opened in a direction orthogonal to the axis line of a cylinder formed by the body portion 12 of the apparatus main body 11. Then, hydrogen chloride gas supplied from the gas supply port 22 into the gas chamber 21 is ejected through the supply hole 4 of the hydrogen chrolide gas ejecting nozzle 1 from the ejection holes 5 into the apparatus main body 11. The gas introduction unit 20 is provided with a gas supply port 22, a gas chamber 21 and a hydrogen chrolide gas ejecting nozzle 1.

Figure 5:
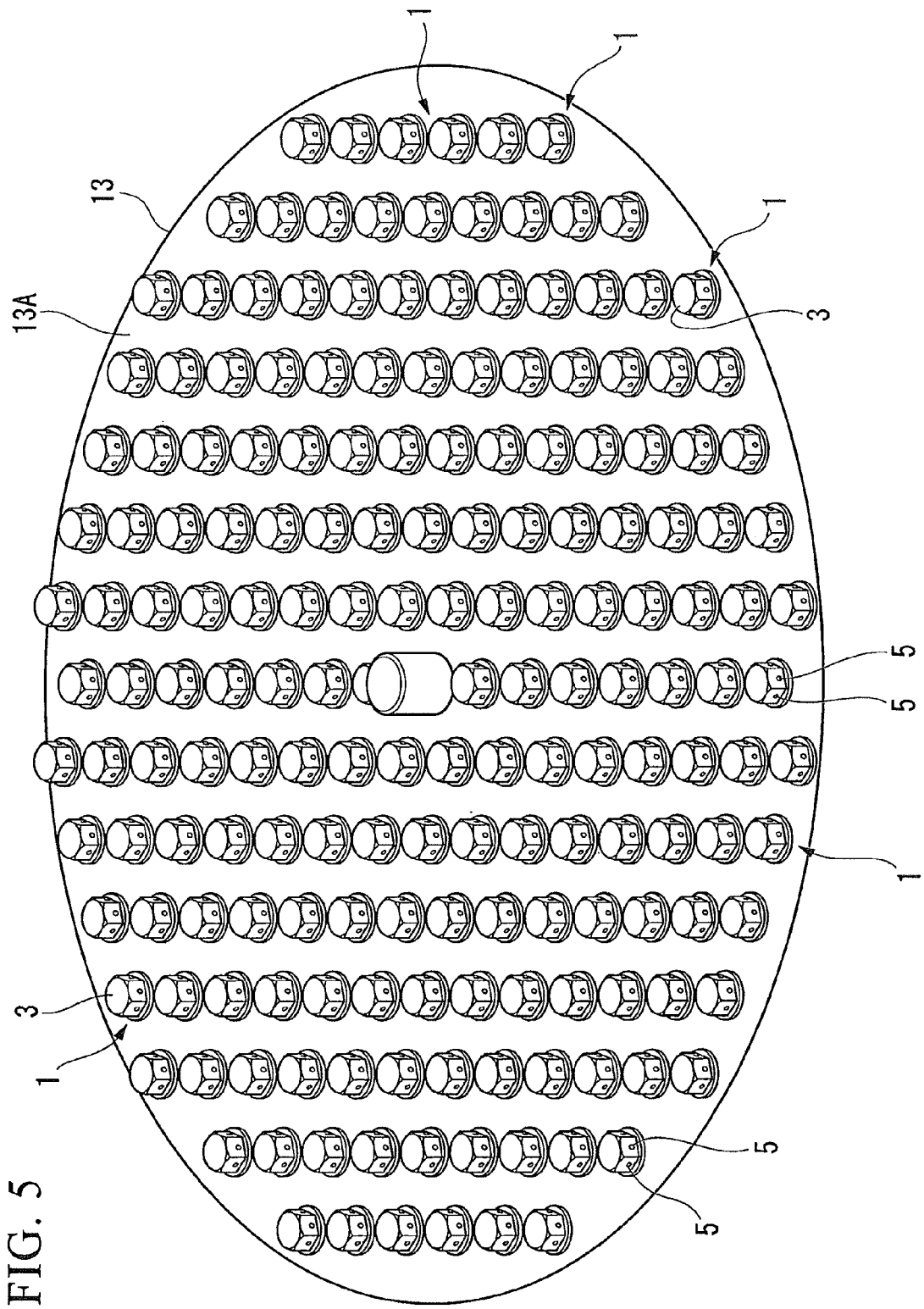
FIG. 5 is a perspective view showing a plurality of members for ejecting hydrogen chloride gas arrayed at the bottom plate portion of the apparatus main body.

In the present embodiment, as shown in FIG. 5, a plurality of hydrogen chloride ejecting nozzles 1 are arrayed in a hound's tooth configuration on whole the upper surface 13A of the bottom plate portion 13.

Next, an explanation will be made for a method for producing trichlorosilane by using the reaction apparatus for producing trichlorosilane 10.

Metal silicon powder is supplied from a silicon powder supply system 40 to the feed hopper 31, introduced into the introduction piping 30 for carrier gas from the feed hopper 31 through a valve 32 and supplied into the apparatus main body 11 through the silicon powder supply port 15 by gas flow transportation. In this case, hydrogen chloride gas is used as a carrier gas for gas flow transportation. The carrier gas is preferably introduced at a constant pressure.

Further, the gas introduction unit 20 is used to introduce hydrogen chloride gas into the apparatus main body 11. The hydrogen chloride gas is ejected to the apparatus main body 11 through a plurality of the members for ejecting hydrogen chloride gas 1 arranged at the bottom plate portion 13 of the apparatus main body 11. The hydrogen chloride gas ejected from the members for ejecting hydrogen chloride gas 1 is introduced into metal silicon powder.

As described above, hydrogen chloride gas is ejected to metal silicon powder inside the apparatus main body 11, by which the metal silicon powder is fluidized inside the apparatus main body 11. The metal silicon powder makes contact with the hydrogen chloride gas, while being fluidized, by which the metal silicon powder is reacted with the hydrogen chloride gas at a predetermined temperature, to generate trichlorosilane gas.

The thus generated trichlorosilane gas is removed from a gas removal port 17 installed on a ceiling 14 of the apparatus main body 11 and supplied to subsequent steps. Further, unreacted metal silicon powder inside the apparatus main body 11 is discharged together with trichlorosilane gas from the gas removal port 17, collected by the cyclone separator 33 at a subsequent step, supplied to the feed hopper 31, introduced into the introduction piping 30 for carrier gas, and supplied again into the apparatus main body 11. The metal silicon powder not collected by the cyclone separator 33 is removed through a filter 34 at a subsequent step.

The hydrogen chrolide gas ejecting nozzle 1 of the present embodiment is provided with a shaft portion 2 formed approximately in a cylindrical shape and a head portion 3 extending in a direction intersecting the longitudinal direction of the shaft portion 2 (the vertical direction in FIG. 1). The shaft portion 2 is arranged so as to extend in a vertical direction of the apparatus main body 11, and the supply hole 4 disposed at the shaft portion 2 is also arranged so as to face the vertical direction of the apparatus main body 11 (the axial direction of a cylinder formed by the body portion 12 of the apparatus main body 11). Then, an opening portion of the ejection hole 5 orthogonal to the supply hole 4 is opened on a side surface of the head portion 3, by which there is no chance that the opening portion of the ejection hole 5 faces upward. As a result, metal silicon powder is less likely to enter into the ejection holes 5, thus making it possible to prevent the ejection holes 5 from being clogged.

Since a plurality of the ejection holes 5 are formed so as to extend radially from the supply hole 4, it is possible to eject hydrogen chloride gas from one hydrogen chrolide gas ejecting nozzle 1 toward a plurality of directions and also accelerate the reaction by widely dispersing hydrogen chloride gas into metal silicon powder. Thereby, the reaction of the metal silicon powder with the hydrogen chloride gas can be further accelerated to improve the production efficiency of trichlorosilane.

Further, since the hydrogen chrolide gas ejecting nozzle 1 is attached removably to the bottom plate portion 13 of the apparatus main body 11, it can be easily exchanged after deterioration due to prolonged use. If the ejection holes 5 become clogged, the member can be cleaned in a state of being removed from the bottom plate portion 13 of the apparatus main body 11. Therefore, it is quite easy in maintenance. Still further, since the head portion 3 of the hydrogen chrolide gas ejecting nozzle 1 is formed in a regular hexagonal column shape, it can be screwed by being engaged with industrial tools such as a wrench and easily attached or detached.

The hydrogen chrolide gas ejecting nozzle 1 of the present embodiment is formed in the same shape as a hexagonal bolt. Therefore, a hexagonal bolt for general use can be bored to produce the hydrogen chrolide gas ejecting nozzle 1, thus making it possible to produce the hydrogen chrolide gas ejecting nozzle 1 at a lower cost.

Further, in the present embodiment, an equalizing pipe 27 communicatively connected to the supply hole 4 is connected to the shaft portion 2 of the hydrogen chrolide gas ejecting nozzle 1, thus making it possible to equalize a pressure of hydrogen chloride gas ejected from the ejection holes 5.

An explanation has been made so far for the hydrogen chrolide gas ejecting nozzle of an embodiment of the present invention. However, the present invention shall not be limited thereto and may be modified in any way within a scope not departing from the technical idea of the invention.

For example, in the present embodiment, an explanation has been made for a case where the ejection holes are formed so as to be orthogonal to a direction at which the supply hole extends. However, the present embodiment shall not be limited thereto but may include the case where the ejection holes intersect the supply hole so that the opening portion will not face upward when attached to the bottom plate portion of the apparatus main body.

An explanation has also been made for the case where six ejection holes are formed in a hexagonal bolt shape. There is no restriction on the number of the ejection holes. It is preferable to make an appropriate design, with consideration given to the arrangement of the members for ejecting hydrogen chloride gas and the shape of the apparatus main body.

Figure 6:
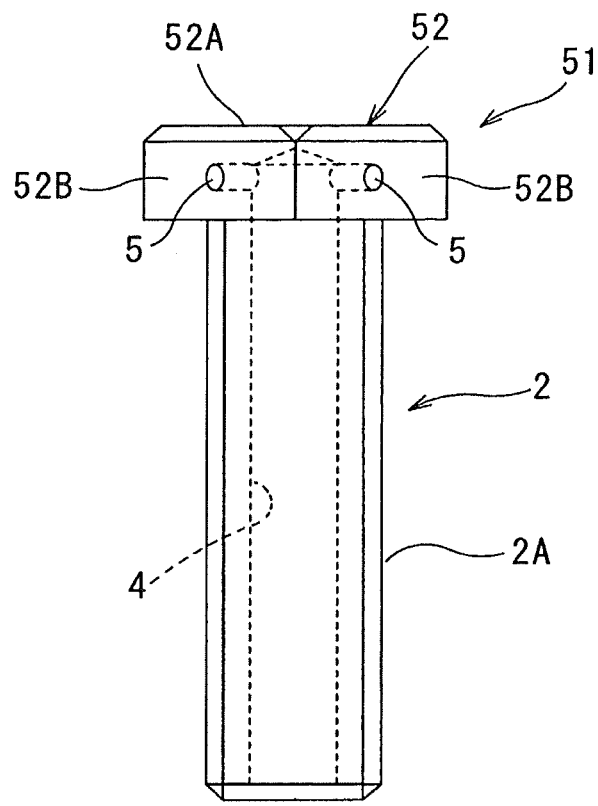
FIG. 6 is a side elevational view of a second embodiment of the hydrogen chrolide gas ejecting nozzle.
Figure 7:
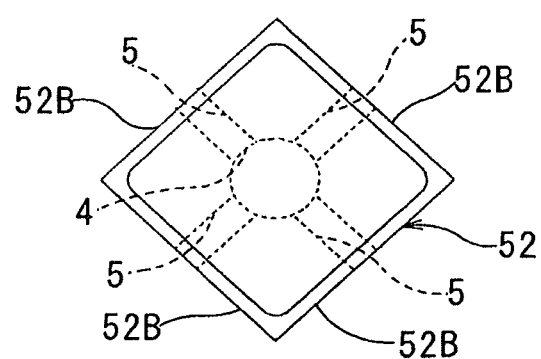
FIG. 7 is a top view of the hydrogen chrolide gas ejecting nozzle given in FIG. 6.
Figure 8:
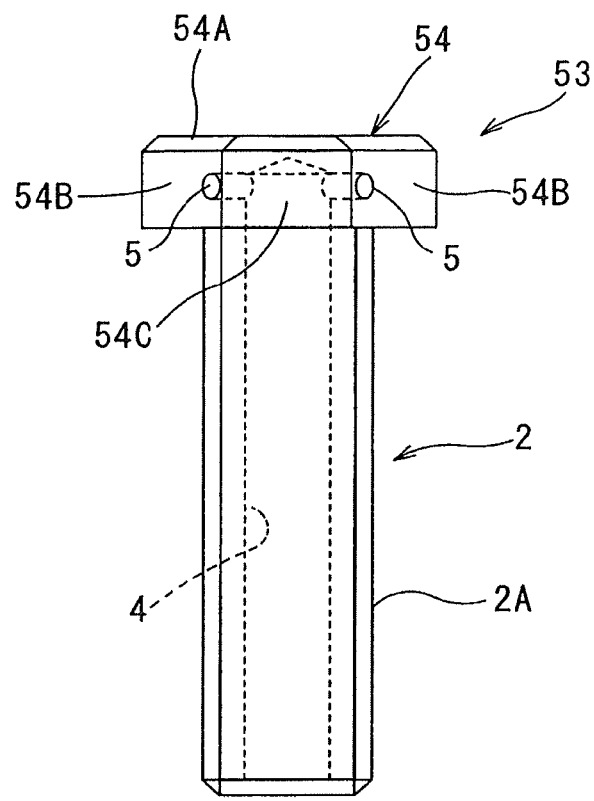
FIG. 8 is a side elevational view showing a third embodiment of the hydrogen chrolide gas ejecting nozzle.
Figure 9:
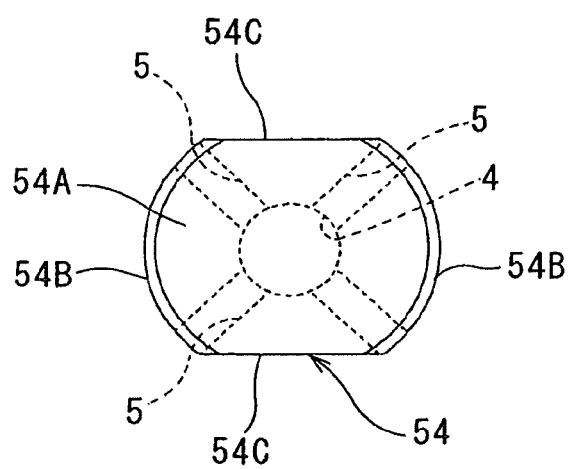
FIG. 9 is a top view of the hydrogen chrolide gas ejecting nozzle given in FIG. 8.
Figure 10:
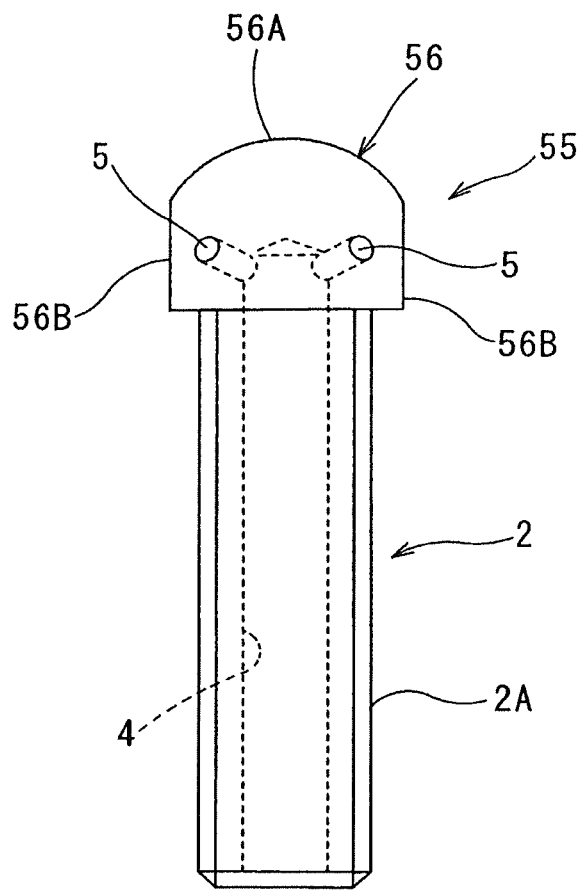
FIG. 10 is a side elevational view showing a fourth embodiment of the hydrogen chrolide gas ejecting nozzle.
Figure 11:
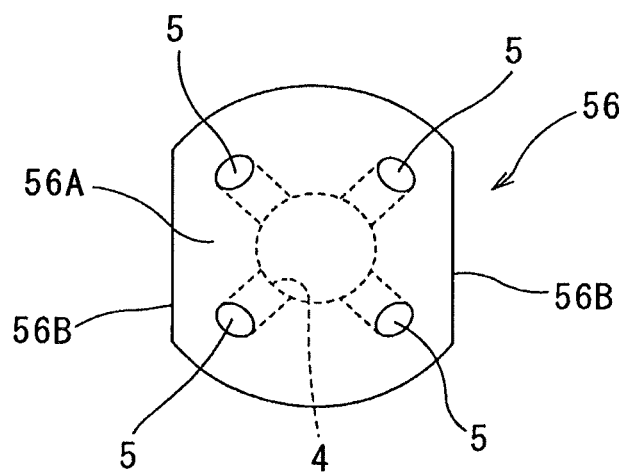
FIG. 11 is a top view of the hydrogen chrolide gas ejecting nozzle given in FIG. 10.

FIG. 6 to FIG. 11 show embodiments of the hydrogen chrolide gas ejecting nozzle. Any one of the embodiments is different in shape of the head portion from a first embodiment but similar in the shaft portion to the first embodiment. Therefore, the same symbols or numerals are given to the shaft portion, an explanation of which is omitted here. Also, the same symbols or numerals are given to other components similar to those of the first embodiment such as the supply hole and the ejection hole. The head portion 52 of the hydrogen chrolide gas ejecting nozzle 51 shown in FIG. 6 and FIG. 7 is fanned in a square shape, when viewed from the top, on a plain surface where the upper surface 52A is orthogonal to a length direction, and four ejection holes 5 orthogonal to the supply hole 4 are respectively opened on each of side surfaces 52B of the head portion 52. The head portion 54 of the hydrogen chrolide gas ejecting nozzle 53 shown in FIG. 8 and FIG. 9 is formed in such a shape that both circular ends when viewed from the top are mutually cut in parallel, and an upper surface 54A is formed on a plain surface orthogonal to the length direction. A pair of circular-arc side surfaces 54B and a pair of planar side surfaces 54C are respectively formed on the side surfaces. Further, four ejection holes 5 orthogonal to the supply hole 4 are respectively opened on the circular-arc side surfaces 54B of the head portion 54. Still further, the hydrogen chrolide gas ejecting nozzle 55 shown in FIG. 10 and FIG. 11 is formed in such a manner that the head portion 56 thereof is formed in a semi-sphere shape and the both ends are partially cut parallel with each other. Therefore, the upper surface 56A of the head portion 56 is formed in a semi-sphere shape, and a pair of planar side surfaces 56B are formed parallel with the length direction. Then, four ejection holes 5 intersecting obliquely the supply hole 4 are opened obliquely upward on the semi-sphere upper surface 56A.

Any one of the members for ejecting hydrogen chloride gas having a plain surface portion of the head portion (each of the side surfaces 52B in FIG. 6 and FIG. 7, planar side surfaces 54C in FIG. 8 and FIG. 9, planar side surfaces 56B in FIG. 10 and FIG. 11) can be attached to or detached from the bottom plate portion by screwing, while engaging tools such as a wrench.

Further the head portion of the hydrogen chrolide gas ejecting nozzle may be formed in a triangular shape, etc., when viewed from the top, in addition to the shapes so far described, as long as such a plain surface is formed so that a tool can be engaged with the side surface.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for producing trichlorosilane by reacting hydrogen chloride gas with metal silicon powder comprising the steps of:
    providing a trichlorosilane producing reactor comprising a hydrogen chloride gas ejecting nozzle comprising:
        a shaft portion, which extends in a longitudinal direction and has a supply hole connecting two distal ends thereof;
        a head portion which is connected to one of the distal ends of the shaft portion;
        ejection holes which are formed in the head portion, open on side walls of the head portion, and extend in directions orthogonal to the longitudinal direction of the shaft portion; and
        an equalizing pipe which is inserted into the supply hole of the shaft portion;
    supplying the metal silicon powder to a lower part of the trichlorosilane producing reactor from a silicon powder supply port;
    ejecting the hydrogen chloride gas from the ejection holes towards a cylindrical body portion of the trichlorosilane producing reactor;
    exhausting a produced trichlorosilane gas including an unreacted metal silicon powder from the trichlorosilane producing reactor;
    collecting an unreacted metal silicon powder by introducing the produced trichlorosilane gas including the unreacted silicon powder into a cyclone separator; and
    re-introducing the unreacted metal silicon powder collected by the cyclone separator into the trichlorosilane producing reactor.

2. The method for producing trichlorosilane according to claim 1 further comprising the step of feeding the unreacted metal silicon powder collected by the cyclone separator into a feed hopper that receives a fresh metal silicon powder supplied from a silicon powder supply system to obtain a mixed metal silicon powder, which contains the unreacted metal silicon powder collected by the cyclone separator and the fresh metal silicon powder.

3. The method for producing trichlorosilane according to claim 2 further comprising the steps of:
    mixing the mixed metal silicon powder with a carrier gas to produce a mixture; and
    supplying the mixture into the trichlorosilane producing reactor through an introduction pipe.

4. The method for producing trichlorosilane according to claim 3, wherein a valve is provided between the feed hopper and the introduction pipe to control a mixing ratio between the mixed metal silicon powder and the carrier gas.

5. The method for producing trichlorosilane according to claim 1, wherein a gas removal port is provided to a ceiling of the trichlorosilane producing reactor, the produced trichlorosilane gas including the unreacted metal silicon powder from the trichlorosilane producing reactor is exhausted from the gas removal port, and the produced trichlorosilane gas including the unreacted metal silicon powder exhausted from the gas removal port is fed into the cyclone separator.

6. The method for producing trichlorosilane according to claim 2, wherein a gas removal port is provided to a ceiling of the trichlorosilane producing reactor, the produced trichlorosilane gas including the unreacted metal silicon powder from the trichlorosilane producing reactor is exhausted from the gas removal port, and the produced trichlorosilane gas including the unreacted metal silicon powder exhausted from the gas removal port is fed into the cyclone separator.

7. The method for producing trichlorosilane according to claim 3, wherein a gas removal port is provided to a ceiling of the trichlorosilane producing reactor, the produced trichlorosilane gas including the unreacted metal silicon powder from the trichlorosilane producing reactor is exhausted from the gas removal port, and the produced trichlorosilane gas including the unreacted metal silicon powder exhausted from the gas removal port is fed into the cyclone separator.

8. The method for producing trichlorosilane according to claim 4, wherein a gas removal port is provided to a ceiling of the trichlorosilane producing reactor, the produced trichlorosilane gas including the unreacted metal silicon powder from the trichlorosilane producing reactor is exhausted from the gas removal port, and the produced trichlorosilane gas including the unreacted metal silicon powder exhausted from the gas removal port is fed into the cyclone separator.

9. The method for producing trichlorosilane according to claim 1 further comprising the step of removing an unreacted metal silicon powder from the produced trichlorosilane gas after the step of collecting the unreacted metal silicon powder by filtering the produced trichlorosilane gas after the step of collecting the unreacted metal silicon powder.

10. The method for producing trichlorosilane according to claim 2 further comprising the step of removing an unreacted metal silicon powder from the produced trichlorosilane gas after the step of collecting the unreacted metal silicon powder by filtering the produced trichlorosilane gas after the step of collecting the unreacted metal silicon powder.

11. The method for producing trichlorosilane according to claim 3 further comprising the step of removing an unreacted metal silicon powder from the produced trichlorosilane gas after the step of collecting the unreacted metal silicon powder by filtering the produced trichlorosilane gas after the step of collecting the unreacted metal silicon powder.

12. The method for producing trichlorosilane according to claim 4 further comprising the step of removing an unreacted metal silicon powder from the produced trichlorosilane gas after the step of collecting the unreacted metal silicon powder by filtering the produced trichlorosilane gas after the step of collecting the unreacted metal silicon powder.

13. The method for producing trichlorosilane according to claim 5 further comprising the step of removing an unreacted metal silicon powder from the produced trichlorosilane gas after the step of collecting the unreacted metal silicon powder by filtering the produced trichlorosilane gas after the step of collecting the unreacted metal silicon powder.

* * * * *